Patented July 27, 1926.

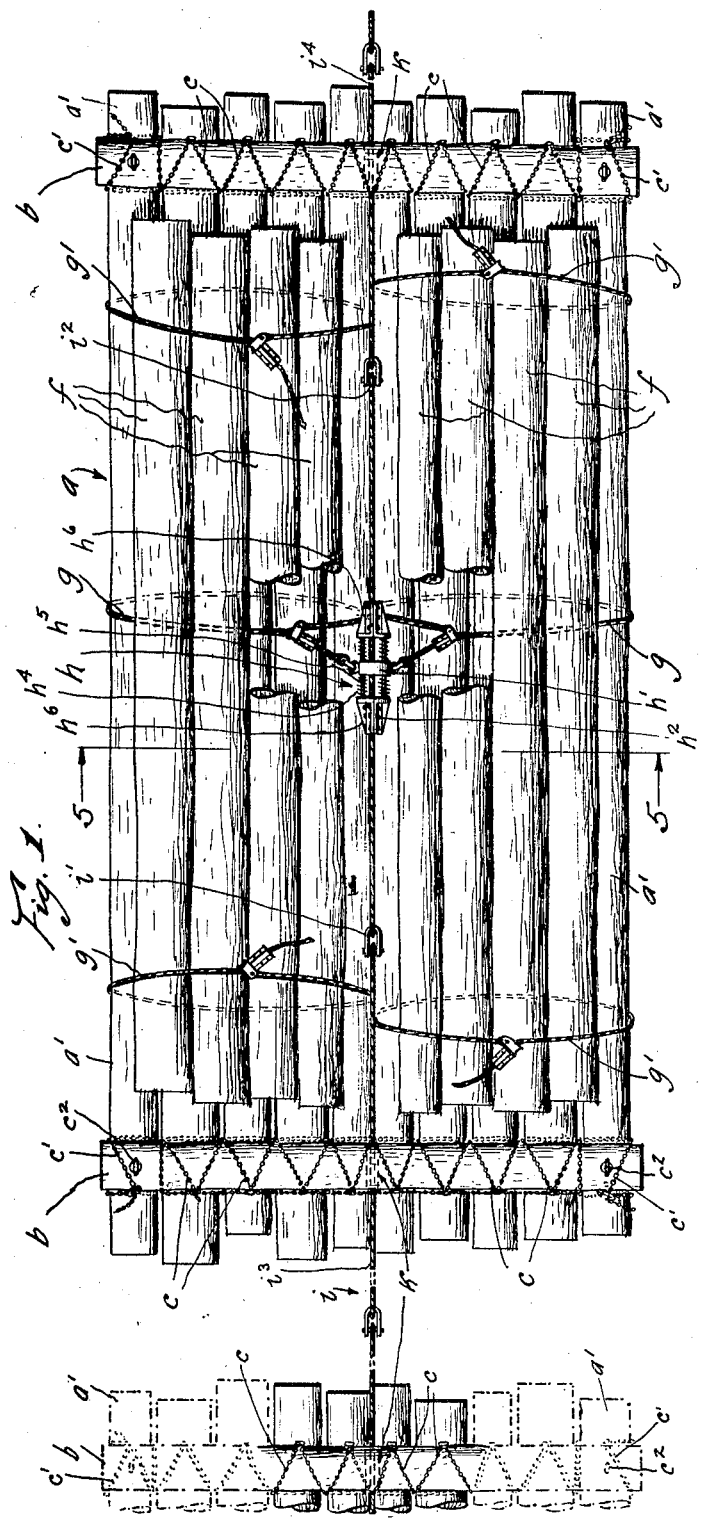

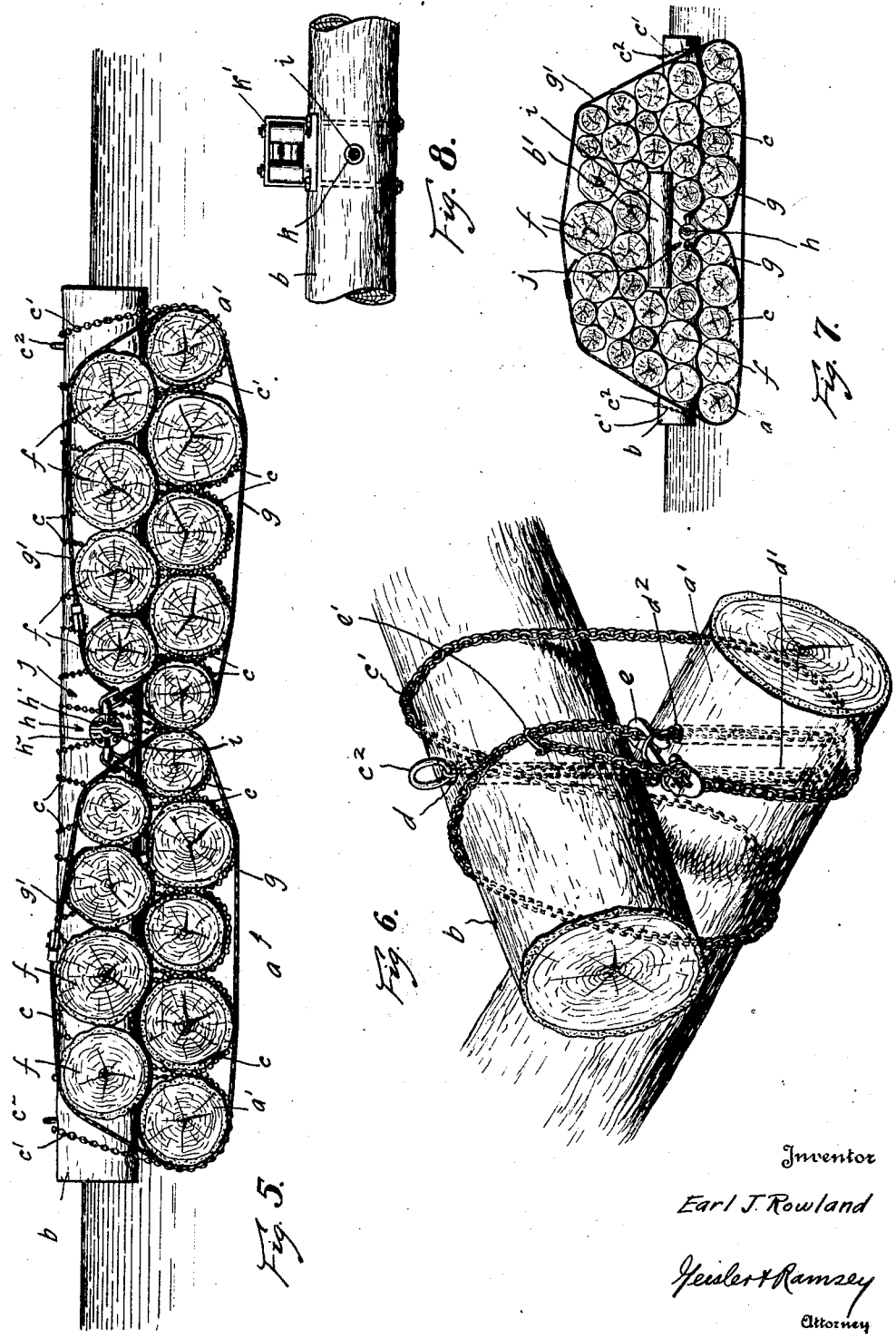

1,594,271

UNITED STATES PATENT OFFICE.

EARL J. ROWLAND, OF PORTLAND, OREGON.

LOG RAFT.

Application filed March 11, 1925. Serial No. 14,710.

My invention relates to logging rafts and especially to sea-going rafts in which the logs not only are confined so as to float in a fixed relation but also are bound tightly together so that the rough water will not break the log tying devices.

The main object of my invention is to provide a raft capable of being floated on a shallow body of water and which contains enough footage of logs to make the towing thereof profitable.

Heretofore it has been common custom to form log rafts by arranging a number of these logs side by side and passing a cable or chain about the same. Sometimes a cradle or form was used to hold the logs while they were being tied together and sometimes a horizontal tier of logs was laced together to provide a floor for said raft. A number of super-imposed tiers or a "deckload" of logs was piled on the floor tier while said tier was floating upon a body of water, and said "deckload" was lashed thereto, thus making said log raft without necessitating a cradle or form. In both types of rafts, however, the bottom was rounded by said tying or lashing chains or cables and the rounded bottom causes said raft to have a relatively great depth for its footage and thus required a relatively deep body of water to float the same. In order to make towing of said rafts profitable it is necessary to make them relatively large and large rafts of the usual type thus require relatively deep water.

On the Pacific coast large stands of timber are tributary to undeveloped shallow harbors, for example, rivers that have sandbars at their mouths. If said timber can be economically rafted out into the ocean and to nearby mills, it can be sold at a profit. At present, however, single unit rafts of such size that towing thereof is profitable cannot be floated out over the shallow harbors. Attempts have been made to make the rafts of a plurality of relatively small units connected together end to end. Rafts made in this manner can be floated in the shallow water but the buffeting of the open seas causes these rafts to be broken up so often that the losses sustained to the towing companies are greater than the profit they make from the rafts that they are able to tow successfully to the mills. It is evident that if the rafts are connected end to end, the connection between the foremost raft unit and the second raft unit has to withstand the towing strain of all of the other trailing units. In towing said log rafts over the open sea, also, the raft units tend to be moved towards and away from each other by the action of the waves and swells and thus the connections are not subjected to a uniform continuous strain. The jerking on said connections often causes them to be broken when said connections are relatively slack and said slack is suddenly snapped out. Furthermore, if the cables or chains which connect the units together are fastened to the lashings about said units, the jerking towing strain imposes such a severe pull upon the same that they often are broken or pulled from about said units to permit the logs in the units to be lost therefrom. If the towing strain pulls the lashing off of one of the foremost units it not only causes said unit to be broken up but causes the trailing units relatively thereto to lose connection with the tow boat. It is difficult, if not impossible, to pick up disconnected raft units in the open sea and thus said units, even if they remain intact, have to be abandoned.

A further and more particular object of my invention therefor is to provide an ocean-going log raft which is composed of a plurality of units, each unit preferably being provided with a substantially flat bottom so as to have a minimum draft for its footage, the floor tier which constitutes said bottom being held by relatively inflexible members to a horizontal plane and being arranged to support a "deckload" which is fastened thereto.

Another object of my invention is to provide an ocean-going log raft which is composed of a plurality of sections, each independently connected to a common tow line, which extends through the longitudinal center line of each unit. By fastening each unit independently and directly to the tow line, the towing strains do not effect the log tying cables of any of the units.

I attain the last mentioned object of my invention by fastening each unit, by yieldable means, to the tow line, and preferably include chokers in said means. I provide transverse logs at the ends of each unit and fasten each log in the floor tiers, independently, to said transverse logs. The logs in the floor tier and in the tiers carried thereby are preferably arranged in groups at each side of said tow line and a choker is passed about each of said groups. Said chokers are preferably arranged to encircle each group at a point intermediate the ends of the logs and between the transverse end logs. By arranging the fastening means in this manner, I tie the bundles of logs together in three places, at each end, and at the middle, and thus if either of the end connections should become broken, the logs will be held in place by the connections at the opposite end, and also by the choker at the middle. The choker would tend to hold said logs to said tow line independently of said end members, but would permit said logs to extend transverse to the line of motion of the raft while being towed. I therefore, provide guiding elements at each end of the raft unit by which the raft is slidably held to the tow line. I also preferably provide a longitudinal channel or tunnel through which said tow lines passes and said guiding elements are arranged to maintain the tow line in central alinement with said channels or grooves to prevent the wedging thereof between the logs.

A further object of my invention it to provide a sectional tow line so that the units of a raft composed of a plurality of such raft units can be quickly and easily fastened together to make up a raft and as quickly be separated when the raft is to be broken up.

The details of construction and operation of my invention are hereinafter described, with reference to the accompanying drawings in which:

Fig. 1 is a plan view of a unit or section of a raft consisting of a plurality of such units, in which a portion of some of the logs have been broken away to disclose details of the fasteing devices;

Fig. 2 is a detailed view of the clamping device by which each raft unit is yieldably fastened to the tow line;

Fig. 3 is an end elevation of such fastening devices taken in direction of the arrow 3 in Fig. 2;

Fig. 4 is a transverse section taken on the line 4—4 of Fig. 2 through said devices;

Fig. 5 is a section taken on the line 5—5 of Fig. 1 through the raft unit;

Fig. 6 is an enlarged perspective view of one corner of such a raft unit showing how the fastening devices are arranged to provide a strong, yet slightly yielding corner;

Fig. 7 is a smaller scaled transverse section similar to Fig. 5, but shows how a deckload of logs can be carried upon the bottom or floor section and how a tunnel is maintained through the raft section to prevent the tow line from becoming wedged between two logs; and Fig. 8 is a fragmentary detailed view illustrating how enlarged guiding holes are bored through the transverse logs or auxiliary devices are provided to constitute guiding elements for the tow line to hold the same in longitudinal alinement with the groove or tunnel through the log raft unit.

My invention is adapted to be used on a log raft which is composed of a single unit or section, or which is composed of a plurality of sections drawn by a single tow line. I consider the latter form preferable, however, and have illustrated my invention as embodied in the latter form of raft.

Each raft unit is composed of a floor tier made up of a plurality of logs $a$ and $a'$ which are arranged side by side and are connected at each end by transverse logs $b$. Each of said logs $a$ is connected at its ends to said logs $b$ by short lengths of chain $c$. By connecting the ends of each log by separate lengths of chain, I thus cause the fastening means for each of said logs to be independent of all the remainder and thus if one fastening chain should become lost, it will not affect the fastening of the other logs. I also preferably fasten the ends of the logs by chains instead of cables because I discovered that when cables are used they are so deformed by being fastened about the logs that they are relatively useless after said rafts are broken up, while chains can be used many times without being permanently deformed.

The corners of the floor tier of the raft are made by boring alined holes $d$ and $d'$ in the logs $b$ and $a'$, respectively. One end of the chain $c'$ is passed through said alined holes so as to connect said logs $b$ and $a'$ together. A ring $c^2$ is fastened to one end of said chain and serves as a stop for preventing that end of the chain from being pulled through the hole $d$ in the log $b$. The chain is drawn taut through said holes and then is doubled back upon itself and then passed upwardly through the hole $d^2$ in the log $a'$.

Said hole $d'$ and $d^2$ in the log $a'$ are arranged parallel to each other through the diameter of said log and spaced a slight distance apart. The chain is then given a half turn around the log $b$, and then another half turn about the log $a'$ and a second half turn about the log $b$ at the opposite side of the hole $d$ and then a second half turn about the log $a'$ on the opposite side of the hole $d$ therein. The chain is then fastened by a double ended clamp $e$ to the portion of the chain which passes out of the hole $d^2$ and said double ended clamp $e$ is arrnged just above the log $a'$. The free end of the chain is fastened to another portion thereof by a clevis $e'$. By arranging the chain in this manner, a very strong corner is made which is capable of withstanding the strains to which the floor tier of said raft is subjected in the open sea, and yet which can yield slightly to said strains so as to prevent being sheared off thereby. In other words, if said corner connections were made by passing a rod through alined holes such as $d$ and $d'$, the strains on said corner connection, caused by the waves and swells on the open sea, would cause said rods to be sheared quickly and thus permit the raft section to become broken.

By fastening the ends of the logs $a$ and $a'$ by the transverse logs $b$, I provide a floor tier which is relatively flat, and thus is capable of floating with much less draft than if it were curved such as is common in similar rafts with which I am familiar.

A deckload such as the second tier of logs $f$ can be piled on the floor, which is composed of logs $a$, $a'$ and $b$, and may or may not be secured thereto by chokers $g'$ which are noosed about said logs $a$ and $a'$, with the free end attached to one eye $h'$ of the fitting $h$ which is releasably clamped to the tow line $i$.

Chokers $g$ are preferably arranged so as to encircle the logs on one side of the tow line only and thus two chokers are arranged side by side and are fastened about the groups of logs at opposite sides of the raft. I preferably arrange said chokers $g$ so that they encompass said logs at approximately their middle, so that the connections with the tow line will be independent of the fastenings for the floor tier. For this reason, if either of the end logs $b$ become entirely separated, it would not release the logs from the unit, or from the tow line because said logs would be held by the choker, as well as, by the transverse log at the opposite end of the unit. If auxiliary chokers $g'$ are provided they are passed about the ends of the logs $a$, $a'$ and $f$ and the free end of said chokers are sometimes fastened to the eyes $h'$ of the fitting $h$ to which the chokers $g$ are fastened, or are connected to similar fittings clamped to the tow line $i$. More frequently they are left unconnected to the tow line so as serve merely as binding or lashing elements to hold the "deckload" to the floor tier.

When I refer to chokers in this application and in the claims appended hereto, I wish to designate a cable formed with one end adapted to be formed into a noose and with the other end adapted to be fastened to the towing line, the noose-like end being arranged to encircle one or more logs.

If the water upon which the logs are to be floated is of sufficient depth it is often desirable to carry a deckload of four or five horizontal tiers, as shown in Fig. 7, and when a deckload of this size is carried, two or more auxiliary chokers $g'$ are provided which pass around the entire log raft and the ends of said chokers are unconnected to the tow line. As can be noted in Fig. 5, the chokers $g$ and $g'$ separate the logs into two units lying side by side and provide a longitudinal channel $j$ through the log raft unit in which the tow line lies at approximately its center.

When more than two tiers are carried by the raft I arrange short transverse logs $b'$ which span the channel $j$ and serve to support the further tiers over said channel. As can be noted in Fig. 1, the logs in the second tier are shorter than the ones in the floor tiers and thus can lie between the transverse logs $b$. The logs in said second tier are approximately the same diameter as the transverse logs $b$ and thus their upper surfaces lie in approximately the same horizontal plane.

I provide horizontally arranged alined guiding holes $k$ in both of the transverse logs $b$ through approximately their center, said holes are substantially larger in diameter than the tow line $i$. Said holes $k$ are also substantially alined with the channel $j$ and are thus adapted to hold the tow line centrally in said groove to prevent it from becoming wedged between two logs. As a substitute for said guide holes $k$ in the logs $b$, I might mount a fair-lead $k'$ upon each of said logs $b$, in alinement with said channel $j$.

The fittings $h$, by which the chokers $g$ are releasably connected to the tow line $i$, being composed of separable halves $h^6$ which are fastened together by bolts $h^2$. Clamping members $h^3$, preferably made of wood, are arranged inside of the bore of each of said halves to provide a better grip upon said tow line. Said fittings are each provided with yieldable connections which consist preferably of pairs of compression springs $h^4$, carried by rods $h^5$, and carry the eye members $h'$ between them. Said eye members $h'$ are unconnected to the cable $i$, except through the clamping halves $h^6$, there being a relatively large clearance between the bore of the eye members $h'$ and the cable $i$, as shown in Fig. 5. For this reason said eye member $h'$ can move slightly relatively to the cable $i$, and thus, when the tow line and the chokers $g$ are slackened by the action of the waves and said slack is suddenly taken up by the tow boat, said tow line and said chokers are not snapped because they are permitted to yield slightly.

I consider this a very important feature of my invention, as I have discovered that the snapping of the tow lines and of the fastening devices is the cause of a large proportion of the losses in towing log rafts at sea, and if some yielding device is not provided the sudden taking up of said slack often causes said raft units to break loose from the said tow line and to be lost for the reason that it is very difficult to pick up said rafts, especially in a rough sea.

I preferably make the tow line $i$ in sections so that the raft units can be quickly assembled in making up a raft and can be quickly broken up and distributed when said raft has reached its destination. Said units are preferably arranged so that the fittings $h$ are each connected to a relatively short length of cable having a clevis $i'$ at one end and an eye $i^2$ at its opposite end. Said length of cable is also preferably connected to another length $i^3$ similarly provided with an eye and a clevis at its opposite ends and extending beyond the opposite end of said raft. By arranging the lengths of cable in this manner the raft units can be wholly made up and the ends of the cables $i^3$ and $i^4$ arranged to extend out from the ends of the raft unit. The raft unit is thus adapted to be coupled to similar raft units, which go to make up a raft consisting of a plurality of units. If said raft units are composed solely of a floor tier, or of a floor tier and a second tier only, as shown in Fig. 1, the tow line is arranged so that a single short length only is carried by the raft unit. The ends of the length of cable at each side of the fitting $h$, thus, will not extend over the ends of the raft unit to drag in the water. If the units are made with a larger deckload, such as four tiers on the floor tier, as shown in Fig. 7, it is essential that the ends of the lengths of cable $i^3$ and $i^4$ extend beyond the ends of the raft unit because otherwise it would be very difficult to pass said cable through the closed channel or tunnel $j'$ therein.

I claim:

1. A log raft comprising a plurality of logs arranged side by side lengthwise with the line of motion of the raft while being towed, a tow line extending lengthwise and centrally of the raft, to which said raft is fastened, said logs being arranged in groups at each side of said tow line, and means connected directly to said groups for holding said groups in said relationship.

2. A log raft comprising a plurality of logs arranged side by side lengthwise with the line of motion of the raft while being towed, a tow line extending lengthwise and centrally of the raft, said logs being arranged in groups at each side of said tow line, and connections between the raft and the tow line, said connections including choker elements fastening the groups of logs independently to said tow line.

3. A log raft comprising a plurality of logs arranged side by side lengthwise with the line of motion of the raft while being towed, a tow line extending lengthwise and centrally of the raft, said logs being arranged in groups at each side of said tow line, means for holding said groups in said relationship, and connections between the raft and the tow line, said connections including tying elements of the choker type fastening the groups of logs independently to said tow line.

4. In a log raft, a floor tier comprising a plurality of logs arranged side by side, a single transverse log secured at each end to the logs constituting said floor tier, a further tier of logs supported on and secured to said floor tier, said transverse logs adapted to hold said floor tier in a plane so that said raft will be substantially flat bottomed, and means constituting a towing connection, said means being fastened to said raft at a point intermediate said transverse logs.

5. In a log raft, a tow line, yielding connections between said raft and said tow line, said yielding connections comprising a piece adapted to have a tying cable affixed thereto, cable-clamping elements located anterior and posterior to said piece and adapted to be engaged with the towing cable, and yielding members between said piece and said clamping elements.

6. In a log raft, a tow line extending centrally through said raft, yielding connections between said raft and said tow line, said yielding connections comprising a piece adapted to have a tying cable affixed thereto, cable-clamping elements located anterior and posterior to said piece and adapted to be engaged with the towing cable, and yielding members between said piece and said clamping elements.

7. In a log raft comprising a plurality of units, a tow line extending centrally through all the units, yielding connections between each unit and said tow line, said yielding connections comprising a piece adapted to have a tying cable affixed thereto, cable-clamping elements located anterior and posterior to said piece and adapted to be engaged with the towing cable, and yielding members between said piece and said clamping elements.

8. In a log raft, a tow line extending lengthwise thereof, connections between said raft and said tow line, said tow line being made in sections arranged so that one section of relatively short length will extend at each side of the connections with said raft.

9. A log raft comprising a plurality of raft units, a tow line extending lengthwise of all of the raft units, connections between each raft unit and said tow line, said tow line being made in sections arranged so that one section of relatively short length will extend at each side of the connections with said raft units.

10. A log raft comprising a floor tier composed of a plurality of logs arranged side by side lengthwise with the line of motion of the raft while being towed, a transverse log secured at each end of said floor tier, and the outside logs in said tier being fastened to said transverse log by a flexible connection, which passes through alined holes in said transverse log and said outside log, and takes a half turn about both of said logs, the free end being secured to the remainder of said chain.

11. A log raft comprising a floor tier composed of a plurality of logs arranged side by side lengthwise with the line of motion of the raft while being towed, a transverse log secured at each end of said floor tier, and the outside logs in said tier being fastened to said transverse log by a section of chain which passes through alined holes in said transverse log and said outside log, and takes a half turn about both of said logs, the free end being secured to the remainder of said chain.

12. A log raft comprising a floor tier composed of a plurality of logs arranged side by side lengthwise with the line of motion of the raft while being towed, a transverse log secured at each end of said floor tier, the outside logs in said tier being fastened to said transverse log by a section of chain which passes through alined holes in said transverse log and said outside log, and takes a half turn about both of said logs, the free end being releasably secured to the remainder of said chain.

13. A log raft comprising a floor tier composed of a plurality of logs arranged side by side lengthwise with the line of motion of the raft while being towed, a transverse log secured at each end of said floor tier, said transverse log lying on top of said floor tier, a second tier of logs supported on and arranged lengthwise with said floor tier and secured to the latter, the logs in said second tier being shorter than the logs in the first tier and lying between said transverse logs, said logs in the second tier being substantially equal in diameter to said transverse logs so that their uppermost portions lie in substantially the same plane as the uppermost portions of said transverse logs.

14. A log raft comprising a floor tier composed of a plurality of logs arranged side by side lengthwise with the line of motion of the raft while being towed, a transverse log secured at each end of said floor tier, a second tier of logs supported on and arranged lengthwise with said floor tier and secured to the latter, the logs in said second tier located adjacent the tow line, being spaced at each side of the latter and the logs in the floor tier being spaced below the latter so as to provide a central, longitudinal channel for said tow line.

15. A log raft comprising a floor tier composed of a plurality of logs arranged side by side lengthwise with the line of motion of the raft while being towed, a transverse log secured at each end of said floor tier, a second tier of logs supported on and arranged lengthwise with said floor tier and secured to the latter, the logs in said second tier located adjacent the tow line, being spaced at each side of the latter and the logs in the floor tier being spaced below the latter so as to provide a central, longitudinal channel for said tow line, and short transverse logs supported on said second tier and extending across said central longitudinal channel, further tiers of logs supported on said second tier and said transverse logs, said transverse logs supporting said further tiers over said channel.

16. A log raft comprising a floor tier composed of a plurality of logs arranged side by side lengthwise with the line of motion of the raft while being towed, a transverse log secured at each end of said floor tier, a second tier of logs supported on and arranged lengthwise with said floor tier and secured to the latter, a towing line extending lengthwise and centrally of the raft, the logs in said second tier located adjacent the tow-line, being spaced at each side of the latter and the logs in the floor tire being spaced below the latter so as to provide a central, longitudinal channel for said tow line, a yielding connection between the raft and said tow line, said yielding connection including a choker encircling the logs in the floor tier located at each side of the towing line.

17. A log raft comprising a floor tier composed of a plurality of logs arranged side by side lengthwise with the line of motion of the raft while being towed, a transverse log secured at each end of said floor tier, a second tier of logs supported on and arranged lengthwise with said floor tier and secured to the latter, a towing line extending lengthwise and centrally of the raft, the logs in said second tier located adjacent the tow line being spaced at each side of the latter and the logs in the floor tiers being spaced below the latter so as to provide a central, longitudinal channel for said tow line, a yielding connection between the raft and said tow line, said yielding connection including a choker encircling the logs in the floor tier located at each side of the towing line, and independent binding means encircling all of the logs in said raft.

18. A log raft comprising a floor tier composed of a plurality of logs arranged side by side lengthwise with the line of motion of the raft while being towed, a transverse log secured at each end of said floor tier, said transverse log lying on top of said floor tier, a second tier of logs supported on and arranged lengthwise with said floor tier and secured to the latter, a towing line extending lengthwise and centrally of the raft, the logs in said second tier being shorter than the logs in the first tier and lying between said transverse logs, said logs in the second tier being substantially equal in diameter to said transverse logs so that their uppermost portions lie in substantially the same plane as the uppermost portions of said transverse logs, the logs in said second tier located adjacent the tow line being spaced at each side of the latter and the logs in the floor tier being spaced below the latter so as to provide a central, longitudinal channel for said tow line, short transverse logs supported on said second tier and extending across said central longitudinal channel, further tiers of logs supported on said second tier and said transverse logs, said transverse logs supporting said further tiers over said channel, and a connection between the raft and said tow line.

19. A log raft comprising a floor tier composed of a plurality of logs arranged side by side lengthwise with the line of motion of the raft while being towed, a transverse log secured at each end of said floor tier, said transverse log lying on top of said floor tier, a towing line extending lengthwise and centrally of the raft, said tow line passing through alined guiding holes in said transverse logs.

20. A log raft comprising a floor tier composed of a plurality of logs arranged side by side lengthwise with the line of motion of the raft while being towed, a transverse log secured at each end of said floor tier, said transverse log lying on top of said floor tier, a towing line extending lengthwise and centrally of the raft said tow line passing through alined guide elements on said transverse logs.

21. A log raft comprising a floor tier composed of a plurality of logs arranged side by side lengthwise with the line of motion of the raft while being towed, a transverse log secured at each end of said floor tier, said transverse log lying on top of said floor tier, a towing line extending lengthwise and centrally of the raft, said tow line passing through alined guiding holes in said transverse logs, said guiding holes extending horizontally through said transverse logs at approximately their middle.

22. A log raft consisting of a plurality of units, each comprising a floor tier composed of a plurality of logs arranged side by side, lengthwise with the line of motion of the raft while being towed, a transverse log secured at each end of said floor tier, a towing line extending lengthwise and centrally of all the raft units, said tow line passing through alined guiding holes in said transverse logs, and a yielding connection between each raft unit and said tow line.

EARL J. ROWLAND.